United States Patent [19]

Brachthäuser

[11] 4,130,945

[45] Dec. 26, 1978

[54] METHOD FOR THE PRODUCTION OF FINE-GRAINED MIXTURE OF MINERAL SOLIDS

[75] Inventor: Kunibert Brachthäuser, Bensberg, Germany

[73] Assignee: Klockner-Humboldt-Deutz Aktiengesellschaft, Germany

[21] Appl. No.: 830,996

[22] Filed: Sep. 6, 1977

[30] Foreign Application Priority Data

Sep. 6, 1976 [DE] Fed. Rep. of Germany ....... 2640044

[51] Int. Cl.² ............................................... F26B 3/08
[52] U.S. Cl. .............................................. 34/10; 34/8; 34/11; 34/12; 34/33; 34/57 R; 34/58; 34/60
[58] Field of Search ...................... 34/10, 8, 11, 12, 33

[56] References Cited

U.S. PATENT DOCUMENTS

| | | | |
|---|---|---|---|
| 2,964,299 | 12/1960 | Bowers et al. | 34/10 X |
| 3,408,745 | 11/1968 | Filippi et al. | 34/10 |
| 3,645,513 | 2/1972 | Deussner | 34/10 X |
| 3,721,014 | 3/1973 | Voelskow | 34/10 X |
| 3,974,572 | 8/1976 | Cerles et al. | 34/10 |

Primary Examiner—Leland A. Sebastian
Attorney, Agent, or Firm—Hill, Gross, Simpson, Van Santen, Steadman, Chiara & Simpson

[57] ABSTRACT

A method for the production of a fine-grained mixture of mineral solids such as pulverized raw material for the calcining of cement clinkers composed of several materials, one of the starting materials constituting a substantial proportion of the total mixture and having a grain size suitable for further processing, but having a relatively high moisture content, and another starting material also constituting a substantial proportion of the total mixture and consisting of coarse grained fragments. In accordance with the present invention, these two starting materials, together with other additives which might be present, are mixed and suspended in a column of heated air to dry the mixture to a moisture level suitable for further processing.

3 Claims, 1 Drawing Figure

METHOD FOR THE PRODUCTION OF FINE-GRAINED MIXTURE OF MINERAL SOLIDS

BACKGROUND OF THE INVENTION

1. Field of the Invention

This invention is in the field of treating mixtures of mineral solids of different sizes and moisture contents to produce a homogeneous mixture suitable for further processing, for example, in a calcining furnace.

2. Description of the Prior Art

The calcining of cement clinkers may occasionally require starting materials of very different characteristics. For example, one of the starting materials may be a clarifying sludge which results as a waste product from limestone processing. This material must be processed jointly with other components required for cement production such as limestone, sand and possibly iron into a pulverized raw material suitable for calcining in the furnace.

One method which has been used involves dehydrating the clarifying sludge by means, for example, of a pressure filter press to achieve a moisture content of approximately 20 to 22% in the filter cake. Since this sludge had a grain size which is substantially appropriate for further processing, it required only an additional drying operation and admixture with the remaining starting materials to be useful in calcining. The clarifying sludge amounted to up to 50% by weight of the pulverized raw material composition, expressed on a dry basis. The remaining 50% consisted essentially of limestone which occurred in large pieces and had a moisture content of about 6 to 8% as a result of a grinding and drying operation. In the prior art practice, the main starting materials, the clarifying sludge and the limestone were treated separately before their combination. In the case of the limestone, this meant a multi-step drying process and a separate drying process designed specifically for the clarifying sludge.

SUMMARY OF THE INVENTION

The present invention provides a simplified method for treating mineral mixture of different sizes and different moisture contents to thereby diminish both the investment costs for equipment as well as the operating costs for the preparation of the pulverized raw material. In accordance with the present invention, the starting materials, together with any additions of secondary components are selectively ground and subjected to joint drying in a current of air. The system of the present invention can conveniently handle a filter cake with a moisture content of about 20% in combination with coarse grained limestone with a moisture content of approximately 6 to 8% in a relatively uncomplicated system.

In accordance with a preferred embodiment of the invention, the relatively moist, finely grained starting materials are combined with recycled portions of finished material and injected into the system between a grinding mill and a particle separator while the coarse grained mineral fragments are supplied directly to the grinding mill.

In the case of an installation equipped with a coarse comminution step and a fine comminution step, the coarse grained starting material is supplied to the coarse comminution step and any secondary components such as oxides preferably having wearing properties are supplied to the fine comminution step. The coarse comminution step may take the form of a hammer mill with a closed bottom with a fine comminution step adjacent thereto, such as a ball mill. These grinding means are connected on the discharge side through a vertical shaft in which a drying carrier gas is passed, the gas stream being integrated with the gas stream common to the drying mills. The suspension gas dryer used in accordance with the present invention produces a finished material fraction and a larger gravel fraction. The grinding mill can thus be operated at their most efficient point while their discharge is being directed into the suspension gas dryer.

With the air drying and grinding installation of the present invention, a filter cake having a water content of 20 to 30% which is quite moist is processed jointly with the coarse material of lesser moisture content, for example, limestone fragments in a single separator which produces a finished material in one operative step.

BRIEF DESCRIPTION OF THE DRAWING

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
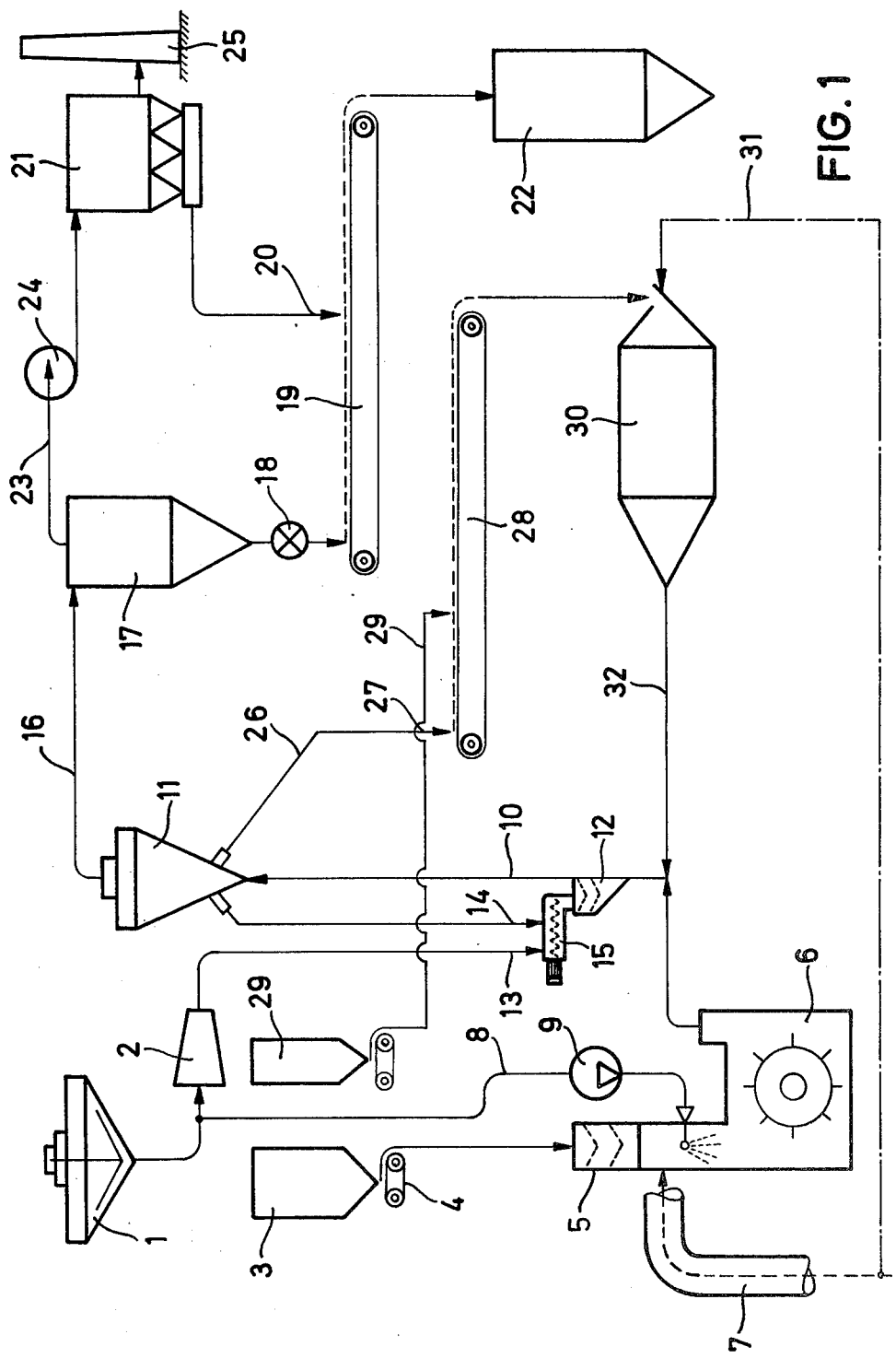
FIG. 1 is a schematic flow diagram illustrating one form of the present invention.

In FIG. 1, reference numeral 1 has been applied generally to a concentrator in which a slurry containing finegrained mineral substances is concentrated to a pumpable slurry with about 30 to 50% water content. In series with the concentrator 1 there is a mechnical dehydrator 2 which may be, for example, a centrifuge, a filter or the like. The product of this mechanical dehydration step is a wet, finely divided material with a water content of 15 to 30% by weight. This material has a particle size suitable for further calcining, but with a relatively high moisture content.

The other starting material, a coarse, lumpy freshly mined mineral fraction supplied from a storage hopper 3 by means of a metering withdrawal member 4, for example, consisting of a belt feeder is supplied through a gas-tight charging valve 5 to a hammer mill 6 having a closed bottom. The hammer mill 6 is attached to a hot gas conduit 7 which, for example, delivers furnace exhaust gas with a temperature of about 300° C. as a drying gas.

Branching off from the connection between the concentrator 1 and the mechanical dehydration means 2 is a conduit 8 which supplies a part of the slurry with the 30 to 50% water content to a pump 9, the pump 9 spraying the slurry with increased pressure into the charging side of the hammer mill 6. The quantity of slurry sprayed in by the pump 9 can be regulated depending on the temperature of the outlet of the hammer mill 6. The means for accomplishing this control function are not shown, however, because they do not enter into the basic features of the invention.

The comminuted material is discharged from the hammer mill 6 with the hot air current and then passes into an uptake or riser 10 which connects the hammer mill 6 with a separator or sifter 11. The riser 10 has at its lower end a gas-tight charging valve 12 through which the mechanically dehydrated finely divided material is introduced through a line 13 where it is combined with a gravel fraction from the separator 11 introduced through a line 14. This relatively moist mixed material is picked up by the hot drying gases and dried in the portion of the riser 10 between the charging valve 12 and the separator 11. A conduit 16 delivers hot gas with finished material from the separator 11 into a separator 17 where the pulverized material is separated from the exhaust gas. The finished material passes through a gas tight charging valve 18 and is delivered onto a conveying device 19, together with fine portions delivered through a line 20 from a filter 21. The conveying means 19 delivers the pulverized material into the finished material hopper 22. A gas conduit 23 leading from the seprator 17 to the filter 21 is provided with an exhaust fan 24 which delivers the exhaust gas after cleansing by means of the filter into a flue 25.

From the separator 11 there is a conduit 26 which delivers gravel to a transporting or conveying device 28. The supply line 40 introduces other additives such as silica, ferric oxide, alumina or the like into the conduit 26 before the material is deposited on the conveying means 28. The gravel from line 27 and the additive from line 40 are jointly supplied to a tube mill 30 which also receives the heated gas from the gas supply conduit 7. The discharge line 32 connected to the tube mill 30 then delivers the partially dried material to the riser 10.

The mill 30 processes material with a moisture content of about 15% maximum. This moisture results from the two main components. For example, the components may consist of 80% slurry with about 20% water, and a 20% limestone fraction with about 5% water, resulting in an overall moisture content of about 13%. When using 25% by weight of a slurry with a 50% water content, in combination with a 25% limestone fraction with about 3.5% water content, the resulting moisture content is about 14.5%. Accordingly, the ratio of slurry to limestone may range from about 80 to 25 weight percent slurry to 20 to 75 weight percent limestone, with the proviso that the total water content of the mixture does not exceed about 15% by weight.

The method according to the present invention may be modified, for example, such that the mixed material coming out of the mixer consisting of sludge premixed with crumbly finished material can be supplied in common with the limestone to the hammer mill.

Furthermore, the sludge and the limestone may be mixed together with some pulverized raw material and as such supplied to the coarse comminution step.

It is also possible without deviating from the scope of the present invention to supply the additives such as silica and ferric oxide which are particularly conducive to wear directly into the ball mill during the fine comminution step.

It will be evident that various modifications can be made to the described embodiments without departing from the scope of the present invention.

I claim as my invention: f

1. A method for the production of a mixture of fine-grained mineral solids from at least two components, each forming an essential part of the mixture, the first of said components being in the form of a slurry and the second of said components being a relatively coarse, moist mineral material, which comprises:
   partially dehydrating said slurry,
   mixing a portion of the partially dehydrated slurry with said second component in a mill while introducing hot drying gases into said mill,
   passing the output of said mill into a sifter,
   further dehydrating the remainder of said partially dehydrated slurry,
   mixing the futher dehydrated remainder with particulate matter recovered from said sifter to produce a relatively moist mixture, and
   combining said relatively moist mixture with the output of said mill en route to said sifter.

2. A method according to claim 1 in which the partial dehydration is carried out to a water content of 30 to 50%.

3. A method according to claim 1 in which the further dehydration is carried out to a water content of 15 to 30%.

* * * * *